US011056002B2

(12) United States Patent
Andersson et al.

(10) Patent No.: US 11,056,002 B2
(45) Date of Patent: Jul. 6, 2021

(54) METHOD, CONTROL UNIT AND SYSTEM FOR AVOIDING COLLISION WITH VULNERABLE ROAD USERS

(71) Applicant: Scania CV AB, Södertälje (SE)

(72) Inventors: Jonny Andersson, Södertälje (SE); Marie Bemler, Mariefred (SE); Joseph Ah-King, Södertälje (SE); Christian Larsson, Stockholm (SE)

(73) Assignee: Scania CV AB, Södertälje (SE)

( * ) Notice: Subject to any disclaimer, the term of this patent is extended or adjusted under 35 U.S.C. 154(b) by 766 days.

(21) Appl. No.: 15/750,154

(22) PCT Filed: Aug. 16, 2016

(86) PCT No.: PCT/SE2016/050761
§ 371 (c)(1),
(2) Date: Feb. 2, 2018

(87) PCT Pub. No.: WO2017/030493
PCT Pub. Date: Feb. 23, 2017

(65) Prior Publication Data
US 2018/0233048 A1 Aug. 16, 2018

(30) Foreign Application Priority Data
Aug. 20, 2015 (SE) .................................. 1551086-0

(51) Int. Cl.
G08G 1/16 (2006.01)
B60R 21/34 (2011.01)
(Continued)

(52) U.S. Cl.
CPC ............. G08G 1/166 (2013.01); B60Q 1/525 (2013.01); B60Q 5/006 (2013.01); B60Q 9/008 (2013.01);
(Continued)

(58) Field of Classification Search
CPC .................. G08G 1/166; B60Q 1/525; B60W 2554/4029; B60W 30/0953; B60W 30/095; B60W 30/0956
See application file for complete search history.

(56) References Cited

U.S. PATENT DOCUMENTS 6,337,637 B1 1/2002 Kubota et al.
6,665,614 B2 12/2003 Sekiguchi
(Continued)

FOREIGN PATENT DOCUMENTS

EP 1095832 A1 5/2001
EP 1947475 A1 7/2008
(Continued)

OTHER PUBLICATIONS

International Search Report for PCT/SE2016/050761 dated Nov. 29, 2016.
(Continued)

Primary Examiner — Kenneth J Malkowski
(74) Attorney, Agent, or Firm — Moore & Van Allen PLLC; W. Kevin Ransom

(57) ABSTRACT

Method and control unit, for avoiding a potential collision between the vehicle and a Vulnerable Road User, VRU. The method comprises: predicting a future path of the vehicle; detecting the VRU and the position of the VRU; determining velocity of the detected VRU; predicting a future position of the detected VRU, based on the VRU position upon detection and the determined VRU velocity; and performing an action for avoiding a collision, when the predicted future position of the VRU is overlapping the predicted future path of the vehicle.

14 Claims, 6 Drawing Sheets

(51) Int. Cl.

| | | |
|---|---|---|
| *B60W 50/14* | (2020.01) | |
| *G01S 13/86* | (2006.01) | |
| *G01S 15/931* | (2020.01) | |
| *B60W 40/04* | (2006.01) | |
| *B60Q 5/00* | (2006.01) | |
| *G01S 13/931* | (2020.01) | |
| *G06K 9/00* | (2006.01) | |
| *B60Q 9/00* | (2006.01) | |
| *B60Q 1/52* | (2006.01) | |
| *B60W 30/095* | (2012.01) | |
| *G01S 15/86* | (2020.01) | |
| *G08G 1/01* | (2006.01) | |

(52) U.S. Cl.
CPC ......... *B60R 21/34* (2013.01); *B60W 30/0956* (2013.01); *B60W 40/04* (2013.01); *B60W 50/14* (2013.01); *G01S 13/86* (2013.01); *G01S 13/867* (2013.01); *G01S 13/931* (2013.01); *G01S 15/86* (2020.01); *G01S 15/931* (2013.01); *G06K 9/00805* (2013.01); *G08G 1/0112* (2013.01); *B60W 2420/42* (2013.01); *B60W 2520/10* (2013.01); *B60W 2520/14* (2013.01); *B60W 2540/18* (2013.01); *B60W 2556/50* (2020.02); *G01S 2013/9316* (2020.01); *G01S 2013/9322* (2020.01); *G01S 2013/9323* (2020.01); *G01S 2013/9324* (2020.01)

(56) References Cited

U.S. PATENT DOCUMENTS

| | | | |
|---|---|---|---|
| 7,777,669 | B2 | 8/2010 | Tokoro et al. |
| 8,725,309 | B2 | 5/2014 | Kubotani et al. |
| 8,954,252 | B1 | 2/2015 | Urmson et al. |
| 9,656,606 | B1 * | 5/2017 | Vose .................... G05D 1/0278 |
| 2001/0053955 | A1 | 12/2001 | Shirai et al. |
| 2010/0100324 | A1 | 4/2010 | Caminiti et al. |
| 2011/0098922 | A1 | 4/2011 | Ibrahim |
| 2011/0128136 | A1 | 6/2011 | Katoh et al. |
| 2011/0184617 | A1 | 7/2011 | Hegemann et al. |
| 2011/0246156 | A1 | 10/2011 | Zecha et al. |
| 2012/0035846 | A1 | 2/2012 | Sakamoto et al. |
| 2012/0299713 | A1 | 11/2012 | Elia et al. |
| 2013/0253815 | A1 | 9/2013 | Orfila et al. |
| 2013/0282277 | A1 | 10/2013 | Rubin et al. |
| 2015/0032372 | A1 | 1/2015 | Fuehrer |
| 2015/0092056 | A1 | 4/2015 | Rau et al. |
| 2016/0318445 | A1 * | 11/2016 | Sugimoto ......... B60W 60/0027 |
| 2016/0355181 | A1 * | 12/2016 | Morales Teraoka ........................ G06K 9/00805 |

FOREIGN PATENT DOCUMENTS

| | | |
|---|---|---|
| EP | 2133851 A1 | 12/2009 |
| WO | 0221156 A2 | 3/2002 |
| WO | 2015009217 A1 | 1/2015 |
| WO | 2015063422 A2 | 5/2015 |

OTHER PUBLICATIONS

Written Opinion of the International Searching Authority for PCT/SE2016/050761 dated Nov. 29, 2016.

Scania CV AB, International Application No. PCT/SE2016/050761, International Preliminary Report on Patentability, dated Feb. 20, 2018.

Scania CV AB, Korean Application No. 10-2018-7006949, Office Action, dated Apr. 30, 2019.

Scania CV AB, European Application No. 16837399.1, Extended European Search Report, dated Mar. 27, 2019.

* cited by examiner

METHOD, CONTROL UNIT AND SYSTEM FOR AVOIDING COLLISION WITH VULNERABLE ROAD USERS

CROSS-REFERENCE TO RELATED APPLICATION(S)

This application is a national stage application (filed under 35 § U.S.C. 371) of PCT/SE2016/050761, filed Aug. 16, 2016 of the same title, which, in turn claims priority to Swedish Application No. 1551086-0, filed Aug. 20, 2015 of the same title; the contents of each of which are hereby incorporated by reference.

FIELD OF THE INVENTION

This document relates to a method, a control unit and a system in a vehicle. More particularly, a method, a control unit and a system is described, for avoiding a potential collision between the vehicle and a Vulnerable Road User (VRU).

BACKGROUND OF THE INVENTION

Non-motorized road users, such as e.g. pedestrians and cyclists as well as motorcyclists and persons with disabilities and/or reduced mobility and orientation are sometimes referred to as Vulnerable Road Users (VRU). This heterogeneous group is disproportionately represented in statistics on injuries and road traffic casualties.

A particularly dangerous scenario is when VRUs are situated in the vehicle driver's blind spot when the vehicle is turning at low speeds.

In addition, pedestrians sometimes try crossing the street on a road sequence without being aware of the problems for the driver to see the pedestrian, assuming that the vehicle driver will let the pedestrian pass (which assumption may become lethal in case the driver does not see the pedestrian).

Another similar problem may appear when driving in city traffic when a bicycle is approaching a vehicle from behind on the inside, while the vehicle is turning right. The bicyclist may then not be able to see the turning indicators of the vehicle, while the vehicle driver may not be able to see the bicyclist, which may result in a serious accident.

The above described scenarios may be in particular severe when the vehicle is a large, sight blocking vehicle such as e.g. a bus, a truck or similar, but also a private car may block the sight of an undersized pedestrian, such as e.g. a child, a wheelchair user or a pet.

No advanced warning systems for VRUs in a vehicle's blind zone is yet put into practice. Simple systems exist on the market today, which are based on ultrasonic sensors which identify the presence of "anything" next to the vehicle when turning or when using turn indicators. Further, US 20110246156 relates to a method for determining the probability of a collision of a vehicle with a living being (VRU). The living being is detected and the current position and at least one trajectory of it is determined. Further, the probability of a collision is determined.

Environment sensors according to previously known VRU warning systems will detect a large number of objects in a city environment, both harmless objects such as lamp posts, traffic signs, parked bicycles, etc., and VRUs. However, they are not capable of distinguishing between harmless immobile objects and VRUs which are only temporally immobile. In order to create a trustworthy and robust VRU warning system, it is important that the system warns only for dangerous situations involving VRUs, without generating false warnings for irrelevant situations.

Furthermore it is important to predict when a driver/vehicle is about to take a sharp turn before it happens in order to build a reliable VRU warning function in a vehicle. A path prediction that is too restrictive will most likely ignore or delay warnings in some dangerous situations, while a too generous path prediction is most likely to give lots of "false" warnings as soon as someone is walking near the vehicle, such as e.g. on the sidewalk separated from the road.

Thus it would be desired to develop an improved VRU warning system.

SUMMARY OF THE INVENTION

It is therefore an object of this invention to solve at least some of the above problems and improve the traffic security.

According to a first aspect of the invention, this objective is achieved by a method in a vehicle for avoiding a potential collision between the vehicle and a Vulnerable Road User (VRU). The method comprises, predicting a future path of the vehicle; detecting the VRU and the position of the VRU; determining velocity of the detected VRU. The method further comprises predicting a future position of the detected VRU, based on the VRU position upon detection and the determined VRU velocity. The method also comprises determining a geographical position of the vehicle; extracting statistical information related to a probability of a collision at the determined geographical position; and wherein the probability of a collision is in-creased at geographical positions where a number of traffic accidents is exceeding a threshold limit; and performing an action for avoiding a collision, when the predicted future position of the VRU is overlapping the predicted future path of the vehicle, or based on the probability of a collision.

According to a second aspect of the invention, this objective is achieved by a control unit in a vehicle. The control unit is configured for avoiding a potential collision between the vehicle and a VRU in accordance with the above.

According to a third aspect of the invention, this objective is achieved by a computer program comprising program code for performing a method according to the first aspect when the computer program is executed in a control unit according to the second aspect.

According to a fourth aspect, this objective is achieved by a system for avoiding a potential collision between the vehicle and a VRU. The system comprises a control unit according to the second aspect. Further the system also comprises a sensor on the vehicle, configured for detecting the VRU and the position of the VRU. The system in addition also comprises a warning emitting device on the vehicle, configured for emitting a warning for avoiding a collision.

Thanks to the described aspects, a reliable VRU warning and collision avoidance system is achieved, based on an accurate path prediction of the vehicle, and a reliable VRU detection and prediction of VRU future path. Thereby a warning system is achieved that warns/intervenes only when a collision with a VRU is really probable, i.e. when the predicted path of the vehicle and a predicted path for the VRU are overlapping. Such system will gain high acceptance and trust as superfluous warnings are eliminated or at least reduced, which in turn is expected to reduce fatalities of turn accidents. Thus increased traffic security is achieved.

Also the driver can be alerted when driving at geographical positions that are in particular exposed to frequent traffic accidents. Thereby, the driver becomes aware of the increased danger and can adapt the vehicle speed thereto. Thereby accidents can be avoided, also when the sensors of the vehicle cannot detect an approaching VRU e.g. due to blocked view, dirty sensors, malfunctioning sensors, unfavourable weather conditions, etc. In addition it is achieved that the action that is made for avoiding a collision is performed based on the probability of a collision, i.e. an increasing level of impact is presented, as the probability of a collision is increased. Thereby, it is avoided that the driver gets tired of a lot of false warnings and starts neglecting them.

Other advantages and additional novel features will become apparent from the subsequent detailed description.

BRIEF DESCRIPTION OF THE DRAWINGS

Embodiments of the invention will now be described in further detail with reference to the accompanying figures, in which.

DETAILED DESCRIPTION OF THE INVENTION

Embodiments of the invention described herein are defined as a method, a control unit and a system, which may be put into practice in the embodiments described below. These embodiments may, however, be exemplified and realized in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
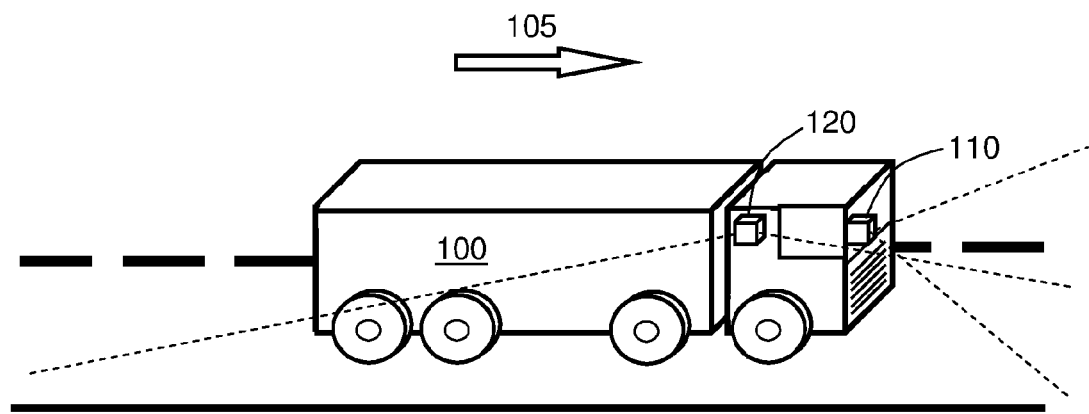
FIG. 1 illustrates a vehicle according to an embodiment of the invention.

FIG. 1 illustrates a scenario with a vehicle 100. The vehicle 100 is driving on a road in a driving direction 105.

The vehicle 100 may comprise e.g. a truck, a bus or a car, or any similar vehicle or other means of conveyance.

Further, the herein described vehicle 100 may be driver controlled or driverless, autonomously controlled vehicles 100 in some embodiments. However, for enhanced clarity, they are subsequently described as having a driver.

The vehicle 100 comprises a camera 110 and a sensor 120. In the illustrated embodiment, which is merely an arbitrary example, the camera 110 may be situated e.g. at the front of the vehicle 100, behind the windscreen of the vehicle 100. An advantage by placing the camera 110 behind the windscreen is that the camera 110 is protected from dirt, snow, rain and to some extent also from damage, vandalism and/or theft.

The camera 110 may be directed towards the front of the vehicle 100, in the driving direction 105. Thereby, the camera 110 may detect a VRU in the driving direction 105 ahead of the vehicle 100. The camera may comprise e.g. a camera, a stereo camera, an infrared camera, a video camera, an image sensor, a thermal camera and/or a time-of-flight camera in different embodiments.

Mounting the camera 110 behind the windshield (looking forward) have some advantages compared to externally mounted camera systems. These advantages include the possibility to use windshield wipers for cleaning and using the light from headlights to illuminate objects in the camera's field of view. Such multi-function camera 110 can also be used for a variety of other tasks, such as detecting objects in front of the vehicle 100, assisting in estimating the distance to an object in front of the vehicle 100, etc.

The sensor 120 may be situated at the side of the vehicle 100, arranged to detect objects at the side of the vehicle 100. The sensor 120 may comprise e.g. a radar, a lidar, an ultrasound device, a time-of-flight camera, and/or similar in different embodiments.

In some embodiments, the sensor 120 may comprise e.g. a motion detector and/or be based on a Passive Infrared (PIR) sensor sensitive to a person's skin temperature through emitted black body radiation at mid-infrared wavelengths, in contrast to background objects at room temperature; or by emitting a continuous wave of microwave radiation and detect motion through the principle of Doppler radar; or by emitting an ultrasonic wave an detecting and analysing the reflections; or by a tomographic motion detection system based on detection of radio wave disturbances, to mention some possible implementations.

By using at least one camera 110 and at least one sensor 120, the advantages of the respective type of device may be combined. The advantage of the camera 110 is that it is enabled to distinguish between e.g. a VRU and another object, also when the VRU is stationary. The advantages of the sensor 120 are the detection range, price, robustness and ability to operate in all weather conditions. Thereby high confidence detections and classifications may be achieved. Thanks to the combination of the camera 110, which may detect the VRU also when it is stationary, and the sensor 120, which may track any VRU detected by the camera 110, a high performance function of a VRU warning/intervention system is achieved, possibly without adding any side viewing camera to the vehicle 100. Thereby the need for dedicated side viewing VRU detection sensors may be eliminated.

By having overlapping fields of view with a side-looking sensor 120 and the camera 110, stationary VRUs can be first detected with the camera 110 when passing them and then "tracked" with the sensor 120 outside the field of view from the camera 110. This allows for VRU warning/intervention on stationary objects even outside the field of view from the camera 110 which is required for VRU warning in the driver's blind spot.

However, the side-looking sensor 120 and the camera 110 do not necessarily require having overlapping fields of view; they may as well have fields of view adjacent to each other, or with a gap in between. A calculation may in the latter case be made for mapping an object detected by the camera 110 with the same object detected by the side-looking sensor 120, in some embodiments.

Figure 2:
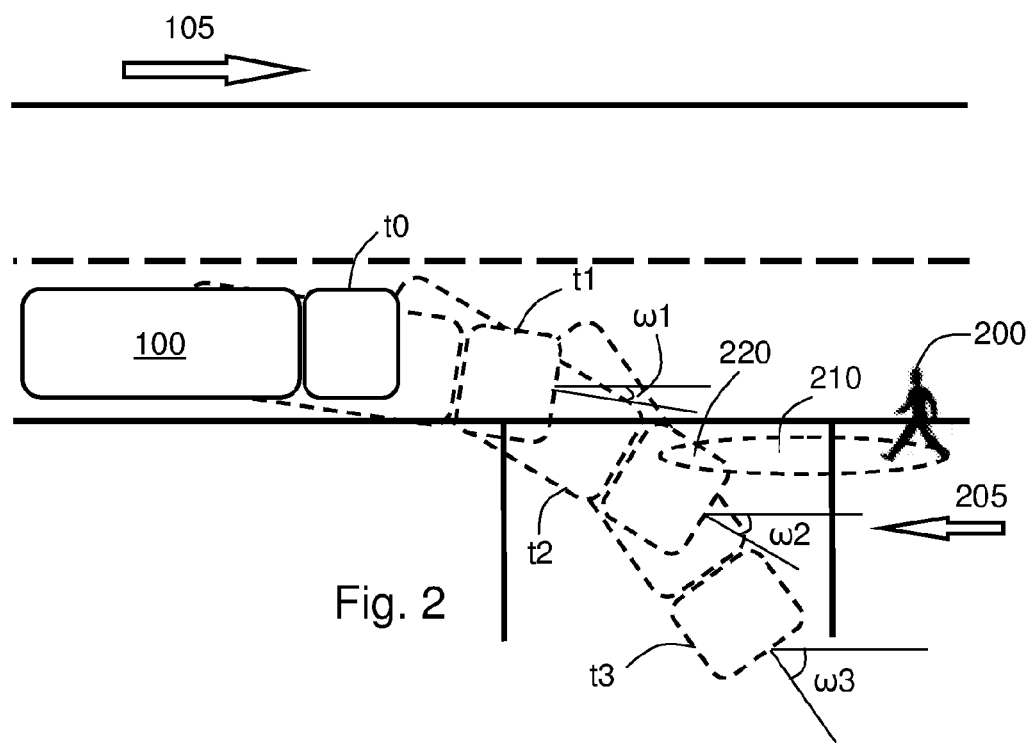
FIG. 2 illustrates an example of a traffic scenario and an embodiment of the invention.

FIG. 2 schematically illustrates a scenario, similar to the previously discussed scenario illustrated in FIG. 1, but seen from an above perspective and wherein a predicted future path of the vehicle 100 is depicted.

A possible path of the vehicle 100 is predicted by using available information. The path prediction comprises determining steering wheel angle and steering wheel rate, and possibly also determining if direction indicators are activated. Further, in some embodiments, the path prediction may also use a camera system that can detect the road surface or natural borders of the road such as elevated sidewalks etc., to improve the path prediction. If high-resolution map data is available, similar effects can be gained by increasing the probability of a turn near an intersection.

The prediction is based on formula [1] for calculating the steady-state relationship between steering wheel angle and yaw rate of the vehicle 100:

$$\alpha_{sw}*v=n*(L+K_{us}*v^2)*\Omega \quad [1]$$

where $\Omega$=yaw rate (rad/s); $\alpha_{sw}$=steering wheel angle (rad); v=vehicle speed; L=effective wheel base (distance from front axle to effective rotation centre); and $K_{us}$=understeer gradient (s$^2$/m).

At low speeds (which are normally relevant for VRU warning systems), the term $K_{us}*v^2$ may be neglected for simplification, leading to:

$$\alpha_{sw}*v=n*L*\Omega. \quad [2]$$

Assuming that $\alpha_{sw}$, $\dot{\alpha}_{sw}$ (steering angle rate) and direction indicator signals can be measured, the possible path can be calculated as:

$$\alpha_s(t)=\alpha_{sw}(0)+\int_0^t \dot{\alpha}_{sw}(t)dt=\alpha_{sw}(0)+\int\int_0^t \ddot{\alpha}_{sw}dt, \quad [3]$$

where the steering wheel acceleration, $\ddot{\alpha}_{sw}$, is assumed to be constant during the turn. The specific value of $\ddot{\alpha}_{sw}$ may be set depending on ego vehicle speed and/or if the turn indicator (for this side) is on according to some embodiments.

Using equations [2] and [3], the yaw rate w for each relevant time step is calculated. Certain limits on steering wheel angle and/or steering wheel rate can also be applied to limit the path prediction when the driver quickly steers to one side. For example, for some vehicle types it might be reasonable to assume that a turn is never more than 90 degrees within a given time frame. For other vehicles, such as a truck with trailer, it might be necessary to steer more to negotiate certain turns. Furthermore, buses with large overhang takes wide curves to negotiate turns, which may also be taken into account in the predictions in some embodiments.

In some embodiments, the vehicle 100 comprises a camera system. The camera system may be able to detect the road surface or natural borders of the road, such as elevated sidewalks etc. Thereby the path prediction may be improved, for example by limiting the path by assuming that the own vehicle 100 stays on the road, or by lowering or limiting the value for $\ddot{\alpha}_{sw}$ when the vehicle 100 is close to the road border. Thereby the number of false warnings for VRUs, such as pedestrians/bicyclists that reside close to the own vehicle 100 but on an elevated sidewalk may be avoided or at least reduced.

In the illustrated arbitrary example, the vehicle 100 is driving straight forward on the road in a first time frame t0, i.e. the yaw rate $\omega$ is zero. By measuring the velocity v of the vehicle 100, the steering wheel angle $\alpha_{sw}$ and the steering angle rate $\dot{\alpha}_{sw}$, and by using equations [2] and [3], the yaw rate $\omega$1 for each time frame t1 is calculated. By iterating the calculations of equations [2] and [3], based on the predicted position in time frame t1, the yaw rates $\omega$2, $\omega$3 and vehicle positions in time frames t2 and t3 may be predicted. It may thereby be predicted that the vehicle 100 is turning to the right, in this example.

An accurate path prediction is the backbone for creating a reliable VRU warning system that only warns/intervenes when a collision with a VRU is really probable and impending. Such system will gain higher acceptance and trust which in turn is expected to reduce fatalities of turn accidents.

However, the disclosed method for path prediction of the vehicle 100 is not limited to VRU warning systems, but may be used for various other purposes.

Furthermore a VRU 200 is detected by the camera 110 and/or the sensor 120 in the vehicle 100. The VRU 200 is moving in a walking direction 205. The position 210 of the VRU 200 in some future time frames is predicted, based on a velocity estimation of the VRU 200.

Depending on the type of sensor 120, a classification of relevant objects may be done. When the sensor 120 comprises a radar or lidar, objects that have been seen moving may be classified as relevant. For the camera 110, objects that are recognized as a VRU 200 may be classified as relevant. Also, objects that are stationary but have been recognized as a VRU 200 by the camera 110 can be tracked outside the camera's field of view and can hence be classified as relevant, as further discussed and explained in FIG. 4A and FIG. 4B.

Depending on the probability of the VRU position in the possible path 210, different stages of warning/intervention can be made to the driver of the vehicle 100/or the vehicle 100. Warning/intervention may only be done when a set of general conditions are fulfilled, which may comprise a limit of ego vehicle speed, such as for example, 0<v<30 km/h; and/or a certain angle of the steering wheel or the activation of the turn indicator to the relevant side.

For example, the following actions 1-4 may be initiated at different probabilities in some embodiments.

(1) P>p1 (collision possible). A silent warning may be shown for example with a diode/lamp in the vehicle 100, or by vibrating the steering wheel/driver's chair etc.

(2) P>p2 (collision with the VRU 200 probable). An audible warning sound may be emitted, alone or on top of action (1) in different embodiments.

(3) P>p3 (collision with the VRU 200 very imminent) a short brake jerk may be initiated and/or a steering wheel torque is induced to counteract the driver's turning action.

(4) P>p4 (if collision is not possible to avoid or has already happened) automatic brake to standstill to avoid running over the VRU 200 with any wheel etc.

Based on the ego vehicle's "possible path" a trajectory of the vehicle 100 may be calculated. Simulation of the ego vehicle's future position may be done over a number of time steps to a maximum simulation time $t_{max}$. By measuring position and velocity (i.e. speed and direction) of detected objects/VRUs 200, the probability distribution of the VRUs' possible future positions may be calculated using a movement model.

The probability of the object's position in the ego vehicle's path may then be calculated, i.e. a measurement of how likely it is that the VRU 200 will be in the vehicle path.

Thereby a VRU warning system is achieved that only warns/intervenes when a collision with the VRU 200 is really probable. Such VRU warning system will gain high acceptance and trust which in turn is expected to reduce fatalities of turn accidents.

Figure 3:
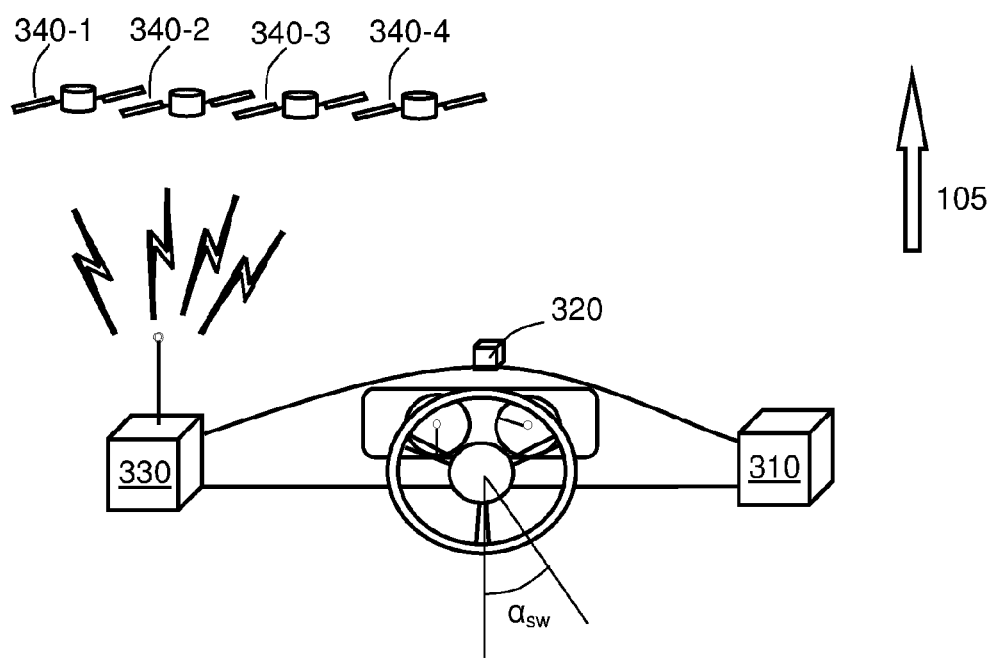
FIG. 3 illustrates an example of a vehicle interior according to an embodiment.

FIG. 3 illustrates an example of a vehicle interior of the vehicle 100 and depicts how the previously scenario in FIG. 1 and/or FIG. 2 may be perceived by the driver of the vehicle 100.

The vehicle 100 comprises a control unit 310. The control unit 310 is able to obtain measurements required to perform the calculations according to equations [2] and Further the vehicle 100 also comprises sensor 320 for measuring steering wheel angle $\alpha_{sw}$ and steering wheel angle rate $\alpha'_{sw}$ of the steering wheel of the vehicle 100. In some embodiments, two or more sensors 320 may be utilized, such as e.g. one sensor 320 for measuring the steering wheel angle $\alpha_{sw}$ and a separate sensor 320 for measuring the steering wheel angle rate $\alpha'_{sw}$.

The velocity of the vehicle 100 may be measured or estimated by the speedometer in the vehicle, or by the positioning device 330.

The geographical position of the vehicle 100 may be determined by a positioning device 330, or navigator, in the vehicle 100, which may be based on a satellite navigation system such as the Navigation Signal Timing and Ranging (Naystar) Global Positioning System (GPS), Differential GPS (DGPS), Galileo, GLONASS, or the like.

The geographical position of the positioning device 330, (and thereby also of the vehicle 100) may be made continuously with a certain predetermined or configurable time intervals according to various embodiments.

Positioning by satellite navigation is based on distance measurement using triangulation from a number of satellites 340-1, 340-2, 340-3, 340-4. In this example, four satellites 340-1, 340-2, 340-3, 340-4 are depicted, but this is merely an example. More than four satellites 340-1, 340-2, 340-3, 340-4 may be used for enhancing the precision, or for creating redundancy. The satellites 340-1, 340-2, 340-3, 340-4 continuously transmit information about time and date (for example, in coded form), identity (which satellite 340-1, 340-2, 340-3, 340-4 that broadcasts), status, and where the satellite 340-1, 340-2, 340-3, 340-4 are situated at any given time. The GPS satellites 340-1, 340-2, 340-3, 340-4 sends information encoded with different codes, for example, but not necessarily based on Code Division Multiple Access (CDMA). This allows information from an individual satellite 340-1, 340-2, 340-3, 340-4 distinguished from the others' information, based on a unique code for each respective satellite 340-1, 340-2, 340-3, 340-4. This information can then be transmitted to be received by the appropriately adapted positioning device comprised in the vehicles 100.

Distance measurement can according to some embodiments comprise measuring the difference in the time it takes for each respective satellite signal transmitted by the respective satellites 340-1, 340-2, 340-3, 340-4 to reach the positioning device 330. As the radio signals travel at the speed of light, the distance to the respective satellite 340-1, 340-2, 340-3, 340-4 may be computed by measuring the signal propagation time.

The positions of the satellites 340-1, 340-2, 340-3, 340-4 are known, as they continuously are monitored by approximately 15-30 ground stations located mainly along and near the earth's equator. Thereby the geographical position, i.e. latitude and longitude, of the vehicle 100 may be calculated by determining the distance to at least three satellites 340-1, 340-2, 340-3, 340-4 through triangulation. For determination of altitude, signals from four satellites 340-1, 340-2, 340-3, 340-4 may be used according to some embodiments.

Having determined the geographical position of the vehicle 100 by the positioning device 330 (or in another way), it may be presented on a map, a screen or a display device where the position of the vehicle 100 may be marked in some optional, alternative embodiments.

In some embodiments, the current geographical position of the vehicle 100 and the computed predicted path of the vehicle 100 may in some embodiments be displayed on an interface unit. The interface unit may comprise a mobile telephone, a computer, a computer tablet or any similar device.

Furthermore, the vehicle 100 may comprise a camera 110 in some embodiments. The camera 110 may be situated e.g. at the front of the vehicle 100, behind the windscreen of the vehicle 100. An advantage by placing the camera 350 behind the windscreen is that the camera 110 is protected from dirt, snow, rain and to some extent also from damage, vandalism and/or theft.

The camera 110 may be directed towards the front of the vehicle 100, in the driving direction 105. Thereby, the camera 110 may detect road limitations ahead of the vehicle 100, such as an elevated sidewalk, and/or a crossroad or road junction.

Figure 4A:
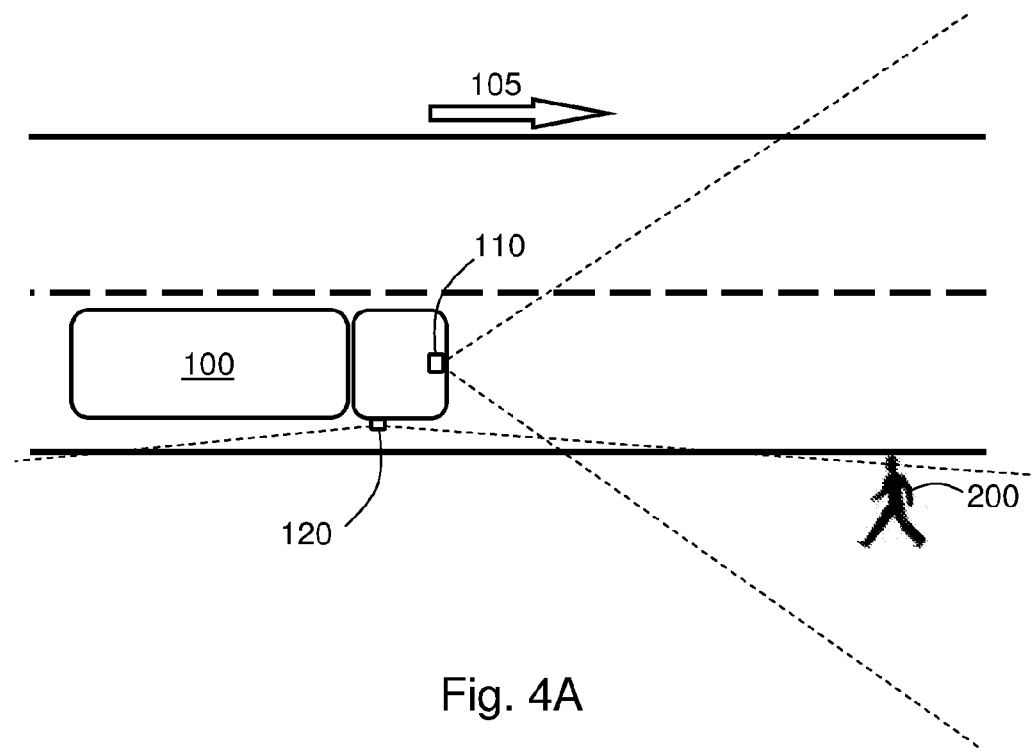
FIG. 4A illustrates an example of a traffic scenario and an embodiment of the invention.

FIG. 4A schematically illustrates a scenario, similar to the previously discussed scenario illustrated in FIG. 2, with the vehicle 100 seen from an above perspective.

When the vehicle 100 is driving in a driving direction 105, a camera 110 detects a VRU 200. An image recognition program may recognize the VRU 200 as a VRU and possibly also categorize it as e.g. a pedestrian, child, bicyclist, animal etc.

As the vehicle 100 is driving forward in the driving direction 105 and approaching the VRU 200, the VRU 200 for a moment becomes situated in an area where it is detected both by the camera 110 and a sensor 120. The VRU 200 may then be mapped with the object 200 detected by the sensor 120. Thereby it becomes possible for the sensor 120 to recognize the VRU 200 as a VRU, also when the VRU 200 is stationary.

However, in other embodiments, there may be no overlap in the field of view between the camera 110 and the sensor 120, respectively. The mapping may anyway be made, based on e.g. an estimation of the distance, direction and/or speed of the object 200; and/or the size or shape of the object 200.

Figure 4B:
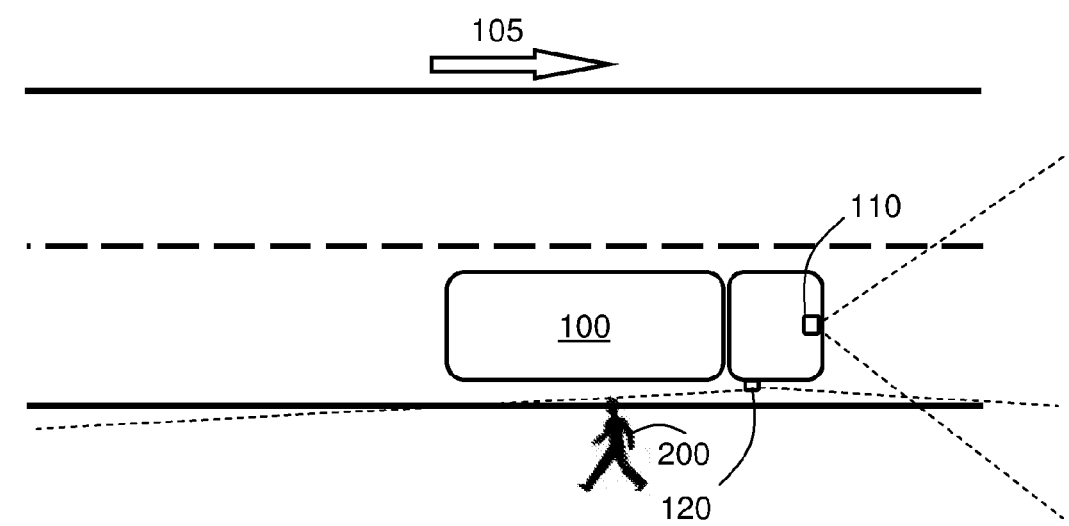
FIG. 4B illustrates an example of a traffic scenario and an embodiment of the invention.

As the vehicle 100 is advancing in the driving direction 105, the VRU 200 becomes out of sight for the camera 110 while still being situated within range of the sensor 120, as illustrated in FIG. 4B. The VRU 200 may then be tracked by the sensor 120 for as long it is situated within detection range of the sensor 120.

An accurate detection and tracking of any VRU 200 in the proximity of the vehicle 100 is the backbone for creating a reliable VRU warning system that only warns/intervenes when a collision with a VRU is really probable and impending. Such system will gain higher acceptance and trust which in turn is expected to reduce fatalities of turn accidents.

However, the disclosed method for VRU detection is not limited to VRU warning systems, but may be used for various other purposes.

Figure 5:
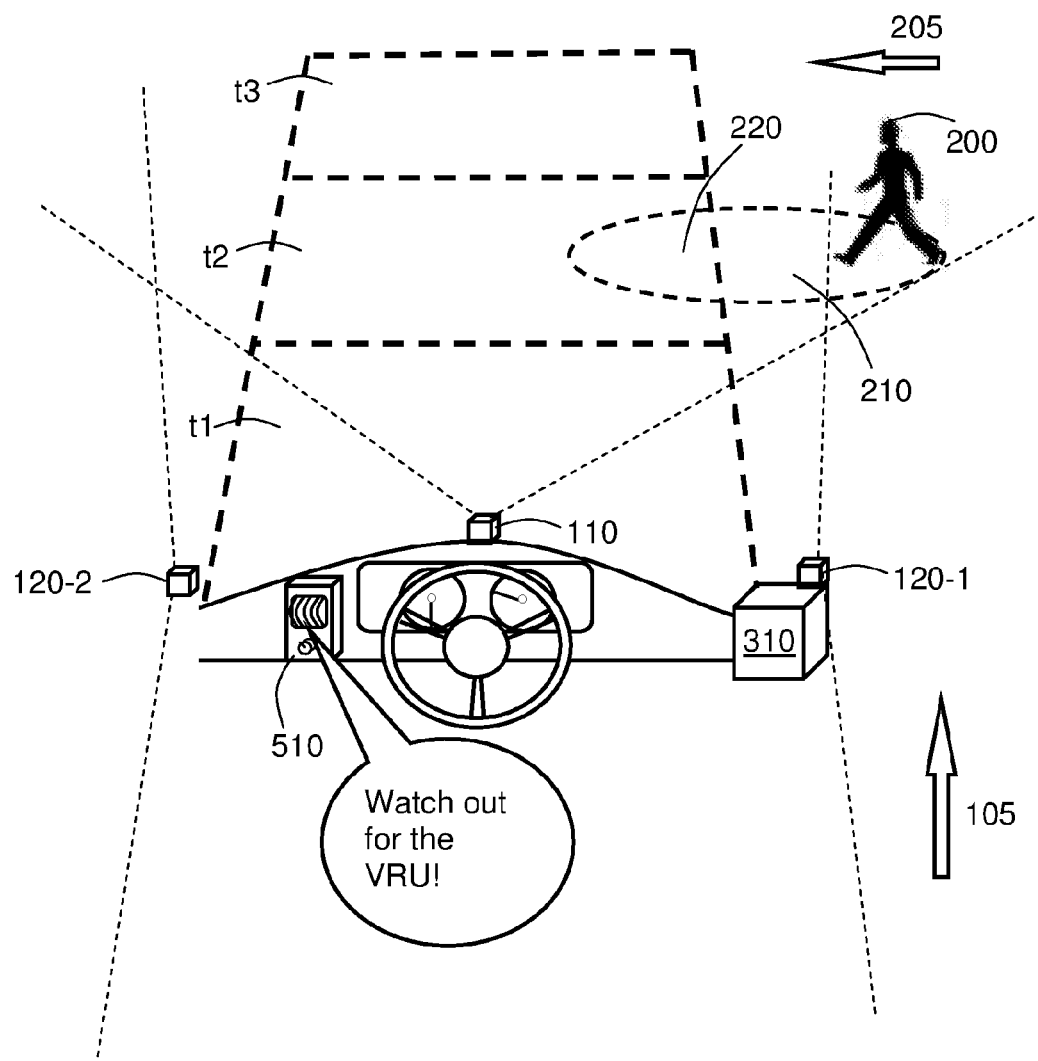
FIG. 5 illustrates an example of a vehicle interior according to an embodiment.

FIG. 5 illustrates an example of a vehicle interior of the vehicle 100 and depicts how the previously scenario in FIG. 1, FIG. 2 and/or FIG. 4A may be perceived by the driver of the vehicle 100.

The vehicle 100 comprises a control unit 310. The control unit 310 is able to recognize the VRU 200 as a VRU, based on one or more images provided by the camera 110. Further the control unit 310 is configured for receiving detection signals from the sensor 120 and mapping the detected VRU with the detection signals received from the sensor 120. Also, the control unit 310 is further configured for tracking the VRU 200 via the sensor 120, as long as the VRU 200 is within range of the sensor 120.

As illustrated, the vehicle 100 may comprise one sensor 120-1 on the right side of the vehicle 100 and one sensor 120-2 on the left side in some embodiments. However, in other embodiments, the vehicle 100 may comprise only one sensor 120 on the right side of the vehicle 100, thereby reducing the number of sensors 120 in the vehicle 100. However, in other embodiments, the vehicle 100 may comprise a plurality of sensors 120 on each side of the vehicle 100. The sensors 120 may be of the same, or different types, such as e.g. radar, lidar, ultrasound, thermal camera, time-of-flight camera, etc.

In the illustrated example, the vehicle 100 comprises one camera 110 situated in front of the vehicle 100 behind the windscreen. However in other embodiments the vehicle 100 may comprise a camera 110 situated at the rear part of the vehicle 100, directed in a direction opposite to the normal driving direction 105. Thus detection of VRUs 200 may be made while backing the vehicle 100. The camera 110 may in such case be situated inside the rear glass, in order to be protected from dirt, snow, etc.

The control unit 310 may communicate with the camera 110 and sensor 120, e.g. via a communication bus of the vehicle 100, or via a wired or wireless connection.

The control unit 310 is calculating and predicting a future path t1, t2, t3 of the vehicle 100 in a number of time frames t1, t2, t3. The control unit 310 is also detecting the VRU 200 via the camera 110 and the sensor 120-1. Based on the movement direction 205 and velocity of the VRU 200, if any, a future position 210 of the VRU 200 in the future time frames t1, t2, t3 is predicted.

In case the predicted future path t1, t2, t3 of the vehicle 100 intervene with the future position 210 of the VRU 200 in an overlap 220, an action may be performed.

Such action may comprise emitting a warning to the driver, emitting a warning to the VRU 200 and/or initiating an automatic action for avoiding a collision with the VRU 200 by an automatic braking and/or automatic evasive action.

The type of action may be dependent on the size of the probability for a collision. Such probability may be proportional to the size of the overlap 220 in some embodiments.

The probability of a collision may also be dependent on a categorization of the VRU 200. To mention some examples, a child or an animal, in particular a game animal may increase the probability of a collision, as children and wild animals typically may behave in an unpredicted and stochastic manner. Some VRUs 200 may on the other hand be expected to behave in a rather predictable way in a traffic situation, for example motorcyclists, which could be expected to be adult, and be aware of the risks with erratic or non-predictable behaviour in road traffic. A motorcyclist typically hold a driver's licence and is thus aware of traffic rules, can read traffic signs etc.

In the illustrated example, an alert is emitted in order to warn the driver and making him/her aware of the VRU 200. In this case an auditive warning is presented to the driver from a warning emitting device 510. However, in other embodiments, such warning may comprise a visual warning on a display, on the dashboard of the vehicle 100, on a head up display, by projecting a visual warning on the windscreen, or the road in front of the vehicle 100, or by a device adapted for Augmented Reality (AR). Such AR device may comprise the windscreen of the vehicle 100, glasses of the driver, lenses of the driver, etc.

Further, a haptic signal or tactile feedback may be provided in the steering wheel, driver seat or similar, for providing a silent alert to the driver.

In some embodiments, a warning may be provided to the VRU 200, e.g. by flashing with the vehicle headlights, which may be in particular effective when driving in dark or obscure light conditions, such as at night time, in twilight, in fog, or when the sun is concealed by clouds. As previously mentioned, a plurality of warning emitting devices 510 of the vehicle 100 may be activated simultaneously for warning the driver and/or the VRU 200, and possibly also other vehicles or road users in the vicinity.

In some embodiments, a warning may be emitted by flashing vehicle headlights at night time, and by activating the horn of the vehicle 100 in daytime. Thereby, the VRU 200 as well as the driver of the vehicle 100 may be notified of the danger in an effective way, while the disturbance of the warning for other road users or people living close is reduced.

Figure 6:
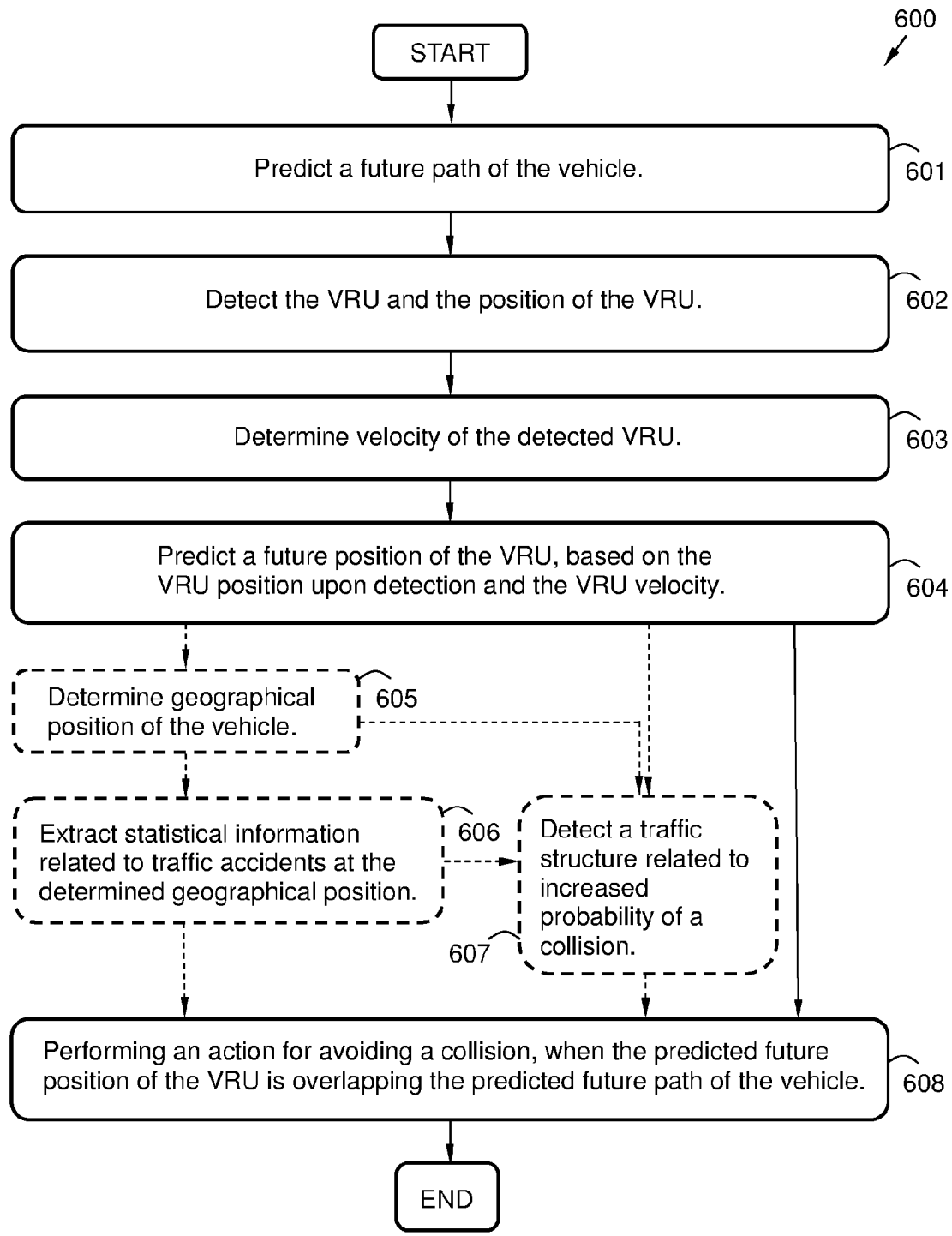
FIG. 6 is a flow chart illustrating an embodiment of the method.

FIG. 6 is a flow chart illustrating an embodiment of a method 600 in a vehicle 100. The method 600 aims at avoiding a potential collision between the vehicle 100 and a VRU 200.

The vehicle 100 may be e.g. a truck, a bus, a car, a motorcycle or similar.

In order to correctly be able to avoid the potential collision between the vehicle 100 and the VRU 200, the method 600 may comprise a number of steps 601-608. However, some of these steps 601-608 may be performed solely in some alternative embodiments, like e.g. step 605, step 606 and/or step 607. Further, the described steps 601-608 may be performed in a somewhat different chronological order than the numbering suggests. The method 600 may comprise the subsequent steps:

Step 601 comprises predicting a future path t1, t2, t3 of the vehicle 100.

In some embodiments, the predicted future path t1, t2, t3 of the vehicle 100 may correspond to a first area t1, t2, t3 occupied by the vehicle 100 during a set of future time frames.

Further, the future path t1, t2, t3 of the vehicle 100 may be predicted by measuring velocity of the vehicle 100. Further the prediction may comprise measuring steering wheel angle $\alpha_{sw}$ and measuring steering wheel angle rate $\alpha'_{sw}$. Also, furthermore the prediction may comprise calculating a future steering wheel angle $\alpha_{sw}$, based on the measured steering wheel angle $\alpha_{sw}$ and the measured steering wheel angle rate $\alpha'_{sw}$. Further the prediction may comprise calculating a future yaw rate w of the vehicle 100 based on the measured velocity of the vehicle 100 and the calculated future steering wheel angle $\alpha_{sw}$. The prediction may furthermore also comprise extrapolating a vehicle position of the vehicle 100 in a set of future time frames, based on the calculated future yaw rate ω and the vehicle velocity. Also, the prediction of the future path t1, t2, t3 of the vehicle 100 may be based on the extrapolated vehicle positions in the set of future time frames.

The extrapolated vehicle position of the vehicle 100 may comprise iteration of the steps of calculating the future steering wheel angle $\alpha_{sw}$ and calculating a future yaw rate w of the vehicle 100.

Furthermore, the steering wheel acceleration $\alpha_{sw}''$ may be assumed to be constant during the set of future time frames and set based on measured velocity of the vehicle, and turn indicator status, in some embodiments.

The prediction of the vehicle path may further be based on road border detection made by a camera 110 in the vehicle 100.

The prediction of the future vehicle path may be further based on a destination of the vehicle 100, extracted from a navigator 330 of the vehicle 100 in some embodiments.

In some embodiments, the calculation of the future steering wheel angle $\alpha_{sw}$ at a time t may be made by:

$$\alpha_{sw}(t)=\alpha_{sw}(0)+\int_0^t \dot{\alpha}_{sw}(t)dt=\alpha_{sw}(0)+\iint_0^t \ddot{\alpha}_{sw}dt.$$

Step 602 comprises detecting the VRU 200 and the position of the VRU 200.

The detection of the VRU 200 and the position of the VRU 200 may in some embodiments comprise detecting an object 200 by a camera 110 of the vehicle 100 and classifying the detected object 200 as a VRU 200. Furthermore, the detection of the VRU 200 may comprise detecting the object 200 by a sensor 120 of the vehicle 100. In addition the detection may also comprise mapping the classified VRU 200 with the object 200 detected by the sensor 120. Also, the detection of the VRU 200 and the position of the VRU 200 may in addition comprise tracking the VRU 200 by the sensor 120.

The camera 110 may comprise e.g. a camera, a stereo camera, an infrared camera, a video camera, or a time-of-flight camera. The sensor 120 may comprise e.g. a radar, a lidar, an ultrasound device, a time-of-flight camera, and/or similar in different embodiments.

The classification of the detected object 200 may be made based on image recognition in some embodiments, by an image recognition program.

Further, the classification may comprise a movement prediction reliability estimation of the VRU 200, wherein unattended animals and people shorter than a configurable threshold length are classified as having reduced movement prediction reliability.

Such classification may further comprise a movement prediction reliability estimation of the VRU 200, wherein motorcycle drivers may be classified as having enhanced movement prediction reliability in some embodiments.

Step 603 comprises determining velocity of the detected 602 VRU 200.

Determining the velocity of the detected 602 VRU 200 may comprise determining speed and movement direction 205 of the VRU 200. The velocity may be determined by analysing a sequence of images of the VRU 200 during a number of time frames.

Step 604 comprises predicting a future position 210 of the detected 602 VRU 200, based on the VRU position upon detection 602 and the determined 603 VRU velocity.

The predicted future position 210 of the VRU 200 may comprise a second area 210 wherein the VRU 200 is expected to be situated at the set of future time frames in some embodiments.

Furthermore, in some embodiments, a probability of a collision to occur may be estimated, proportional to an overlap 220 between the first area t1, t2, t3 and the second area 210.

The probability of a collision may furthermore be increased when the VRU 200 is detected 602 as an unattended animal, such as a game animal, or a person shorter than a configurable threshold length, such as i.e. a child.

Step 605 which may be performed only in some particular embodiments, comprises determining geographical position of the vehicle 100.

The current vehicle position may be determined by a geographical positioning device 330, such as e.g. a GPS. However, the current position of the vehicle 100 may alternatively be detected and registered by the camera 110 in some embodiments, by detecting e.g. a pedestrian crossing or similar.

Step 606 which may be performed only in some particular embodiments wherein the geographical position of the vehicle 100 has been determined 605, comprises extracting statistical information related to a probability of a collision at the determined 605 geographical position. The probability of a collision may be increased at geographical positions where a number of traffic accidents is exceeding a threshold limit or where the determined 605 geographical position is identified as a pedestrian crossing.

Such statistical information may be based on historical accidents at certain geographical positions, stored in a database, which may be kept in the vehicle 100, or external to the vehicle 100 but accessible from the vehicle 100 via a wireless communication interface. Such information may be provided e.g. by a third party provider.

However, in some embodiments, the statistical information may comprise information over certain traffic scenarios, which may present an increased probability of an accident, such as for example unattended crossings, game fence ending, etc.

Step 607 which may be performed only in some particular embodiments, comprises detecting a traffic structure related to increased probability of a collision. Such traffic structure may comprise e.g. a pedestrian crossing, vicinity of a school or playground, road crossing, wild game zones, etc. Such traffic structure may be detected by the forward directed camera 110 of the vehicle 100 in some embodiments. However, in some other alternative embodiments, the traffic structure having an increased probability of a collision may be detected by a sensor based on electromagnetic radiation such as radio signals, light signals etc.

Step 608 comprises performing an action for avoiding a collision, when the predicted 604 future position 210 of the VRU 200 is overlapping 220 the predicted 601 future path t1, t2, t3 of the vehicle 100.

In some embodiments, the action may be performed when the probability of a collision exceeds a first threshold limit.

In some embodiments, the probability of a collision may be increased at geographical positions where a number of traffic accidents is exceeding a threshold limit and the action for avoiding a collision may be performed based on the probability of a collision.

The action to be performed may comprise a silent warning visually or haptically displayed to the driver of the vehicle 100, an audible warning, a short brake jerk for alerting the driver, a full brake to standstill or an alert for warning the VRU 200 of the collision risk, in some embodiments.

Further the silent warning may be visually or haptically displayed to the driver of the vehicle 100 when the probability of a collision exceeds a first threshold limit. The audible warning may be emitted when the probability of a collision exceeds a second threshold limit. Further, the short brake jerk may be performed when the probability of a collision exceeds a third threshold limit. Furthermore, the full brake to standstill may be performed when the probability of a collision exceeds a fourth threshold limit, in some embodiments.

Figure 7:
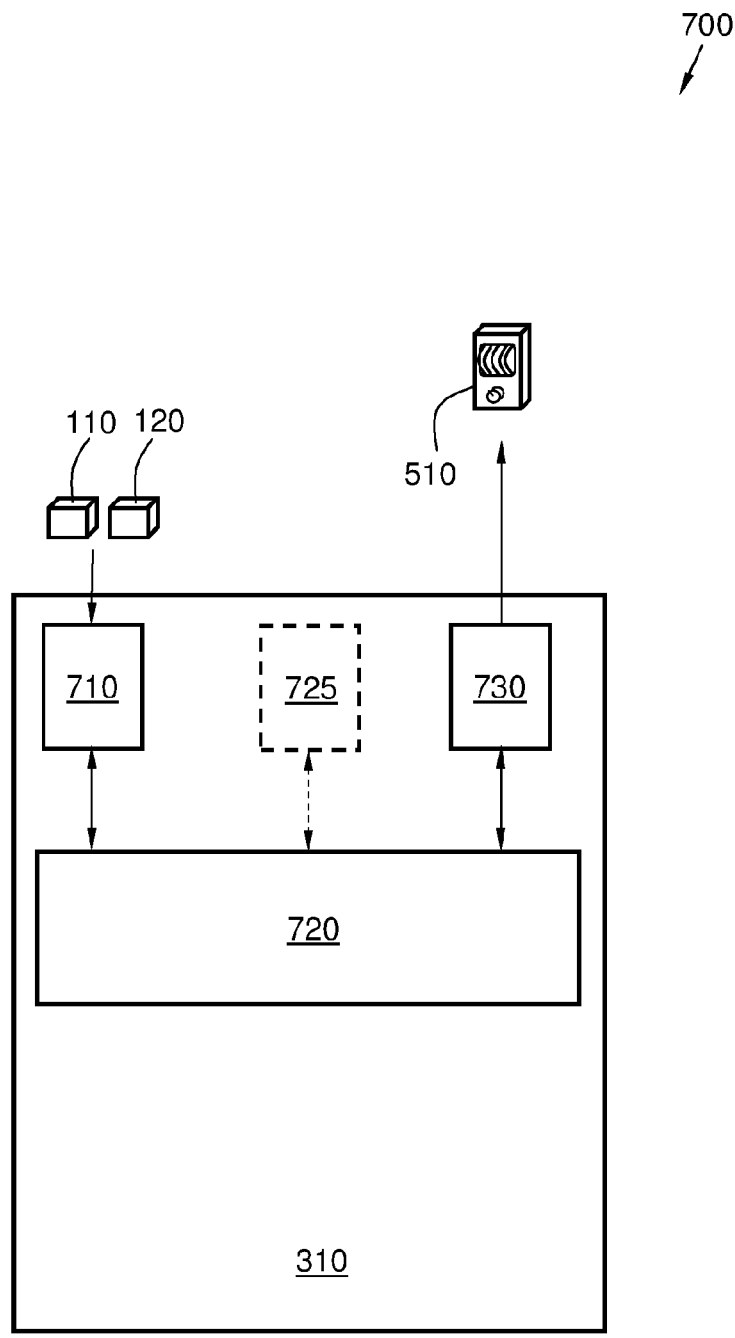
FIG. 7 is an illustration depicting a system according to an embodiment.

FIG. 7 illustrates an embodiment of a system 700 for avoiding a potential collision between the vehicle 100 and a VRU 200. The system 700 may perform at least some of the previously described steps 601-608 according to the method 600 described above and illustrated in FIG. 6.

The system 700 comprises a control unit 310 in the vehicle 100. The control unit 310 is arranged for avoiding a potential collision between the vehicle 100 and a VRU 200. The control unit 310 is configured for predicting a future path t1, t2, t3 of the vehicle 100. Further the control unit 310 is configured for detecting the VRU 200 and the position of the VRU 200 via a sensor 120. The control unit 310 is also configured for determining velocity of the detected VRU 200. In further addition, the control unit 310 is also configured for predicting a future position of the detected VRU 200, based on the position of the detected VRU 200 and the determined VRU velocity. The control unit 310 is configured for performing an action for avoiding a collision, when the predicted future position 210 of the VRU 200 is overlapping 220 the predicted future path t1, t2, t3 of the vehicle 100.

The action for avoiding a collision may be dependent on the size of the overlap 220 between the predicted future position 210 of the VRU 200 and the predicted future path t1, t2, t3 of the vehicle 100 in some embodiments.

Further the control unit 310 may be configured for predicting a future path t1, t2, t3 of the vehicle 100 which corresponds to a first area t1, t2, t3 occupied by the vehicle 100 during a set of future time frames. The predicted future position 210 of the VRU 200 may comprise a second area 210 wherein the VRU 200 may be expected to be situated at the set of future time frames. The probability of a collision to occur may be proportional to the overlap 220 between the first area t1, t2, t3 and the second area 210. Also, the control unit 310 may be configured for performing the action when the probability of a collision exceeds a first threshold limit, in some embodiments. Further, in some embodiments, an overlap 220 between an area T1 predicted to be occupied by the vehicle 100 close in time and the second area 210, predicted to be occupied by the VRU 200 close in time may be considered more critical than an overlap 220 between an area T3 predicted to be occupied by the vehicle 100 more remote in time and the second area 210, predicted to be occupied by the VRU 200 more remote in time.

The control unit 310 may also be configured for generating control signals for performing the action by emitting a silent warning visually or haptically displayed to the driver of the vehicle 100, an audible warning, a short brake jerk for alerting the driver, a full brake to standstill or an alert for warning the VRU 200 of the collision risk.

Further the control unit 310 may in addition be configured for generating control signals for emitting a silent warning, visually or haptically displayed to the driver of the vehicle 100 when the probability of a collision exceeds a first threshold limit. The control unit 310 may also be configured for generating control signals for emitting an audible warning when the probability of a collision exceeds a second threshold limit. Also, the control unit 310 may also be configured for generating control signals for performing a short brake jerk when the probability of a collision exceeds a third threshold limit. The control unit 310 may be configured for generating control signals for performing a full brake to standstill when the probability of a collision exceeds a fourth threshold limit.

The control unit 310 may furthermore be configured for increasing the probability of a collision when the VRU 200 is detected as an unattended animal or a person shorter than a configurable threshold length.

Furthermore, the control unit 310 may be configured for determining geographical position of the vehicle 100 in some embodiments. The control unit 310 may also be configured for extracting statistical information related to traffic accidents at the determined geographical position. Also, the control unit 310 may be further configured for increasing the probability of a collision at geographical positions where a number of traffic accidents is exceeding a threshold limit. Further, the control unit 310 may also be configured for detecting a traffic structure related to increased probability of a collision in some embodiments.

The control unit 310 may be configured for predicting the future path t1, t2, t3 of the vehicle 100 by measuring velocity of the vehicle 100. Further the control unit 310 may be configured for measuring steering wheel angle $\alpha_{sw}$ in some embodiments. The control unit 310 may also be configured for measuring steering wheel angle rate $\alpha'_{sw}$. Also, the control unit 310 may be configured for calculating a future steering wheel angle $\alpha_{sw}$, based on the measured steering wheel angle $\alpha_{sw}$ and the measured steering wheel angle rate $\alpha'_{sw}$. Further the control unit 310 may also be configured for calculating a future yaw rate $\omega$ of the vehicle 100 based on the measured velocity of the vehicle 100 and the calculated future steering wheel angle $\alpha_{sw}$. In further addition, the control unit 310 may also be configured for extrapolating a vehicle position of the vehicle 100 in a set of future time frames, based on the calculated future yaw rate w and the vehicle velocity. Further, the control unit 310 may also be configured for predicting the path of the vehicle 100 based on the extrapolated vehicle positions in the set of future time frames, according to some alternative embodiments.

In further addition, the control unit 310 may also be configured for detecting the VRU 200 and the position of the VRU 200 by: detecting an object 200 by a camera 110 of the vehicle 100; classifying the detected object 200 as a VRU 200; detecting the object 200 by a sensor 120 of the vehicle 100; mapping the classified VRU 200 with the object 200 detected by the sensor 120; and tracking the VRU 200 by the sensor 120.

The control unit 310 comprises a receiving circuit 710 configured for receiving a signal from the sensor 320, from the positioning device 330 and/or the camera 110.

Further, the control unit 310 comprises a processor 720 configured for performing at least some steps of the method 600, according to some embodiments.

Such processor 720 may comprise one or more instances of a processing circuit, i.e. a Central Processing Unit (CPU), a processing unit, a processing circuit, an Application Specific Integrated Circuit (ASIC), a microprocessor, or other processing logic that may interpret and execute instructions. The herein utilized expression "processor" may thus represent a processing circuitry comprising a plurality of processing circuits, such as, e.g., any, some or all of the ones enumerated above.

Furthermore, the control unit 310 may comprise a memory 725 in some embodiments. The optional memory 725 may comprise a physical device utilized to store data or programs, i.e., sequences of instructions, on a temporary or permanent basis. According to some embodiments, the memory 725 may comprise integrated circuits comprising silicon-based transistors. The memory 725 may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

Further, the control unit 310 may comprise a signal transmitter 730. The signal transmitter 730 may be configured for transmitting a control signal to e.g. a display device, or a VDU warning system or warning device 510, for example.

The system 700 further comprises a sensor 120 in the vehicle 100 configured for detecting the VRU 200 and the position of the VRU 200.

In addition the system 700 also comprises a warning emitting device 510 on the vehicle 100, configured for emitting a warning for avoiding a collision.

Further, in some alternative embodiments, the system 700 may comprise a positioning device 330 for determining geographical position of the vehicle 100 in some embodiments.

The system 700 may furthermore comprise a camera 110 in the vehicle 100, in some embodiments.

The system 700 may further comprise a sensor in the vehicle 100, configured for measuring steering wheel angle $\alpha_{sw}$ and steering wheel angle rate $\alpha'_{sw}$ of the steering wheel of the vehicle 100. The sensor may comprise e.g. a camera, a stereo camera, an infrared camera, a video camera or similar.

The above described steps 601-608 to be performed in the vehicle 100 may be implemented through the one or more processors 720 within the control unit 310, together with computer program product for performing at least some of the functions of the steps 601-608. Thus a computer program product, comprising instructions for performing the steps 601-608 in the control unit 310 may perform the method 600 comprising at least some of the steps 601-608 for predicting a path of the vehicle 100, when the computer program is loaded into the one or more processors 720 of the control unit 310.

Further, some embodiments may comprise a vehicle 100, comprising the control unit 310, configured for avoiding a potential collision between the vehicle 100 and a VRU 200, according to at least some of the steps 601-608.

The computer program product mentioned above may be provided for instance in the form of a data carrier carrying computer program code for performing at least some of the steps 601-608 according to some embodiments when being loaded into the one or more processors 720 of the control unit 310. The data carrier may be, e.g., a hard disk, a CD ROM disc, a memory stick, an optical storage device, a magnetic storage device or any other appropriate medium such as a disk or tape that may hold machine readable data in a non-transitory manner. The computer program product may furthermore be provided as computer program code on a server and downloaded to the control unit 310 remotely, e.g., over an Internet or an intranet connection.

The terminology used in the description of the embodiments as illustrated in the accompanying drawings is not intended to be limiting of the described method 600; the control unit 310; the computer program; the system 700 and/or the vehicle 100. Various changes, substitutions and/or alterations may be made, without departing from invention embodiments as defined by the appended claims.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms such as via Internet or other wired or wireless communication system.

The invention claimed is:

1. A method for use with a vehicle, for avoiding a potential collision between the vehicle and a Vulnerable Road User, VRU, wherein the method comprises:
    predicting a future path of the vehicle by:
        measuring a velocity of the vehicle;
        measuring a steering wheel angle ($\alpha_{sw}$);
        measuring a steering wheel angle rate ($\alpha'_{sw}$);
        calculating a future steering wheel angle ($\alpha_{sw}$), based on the measured steering wheel angle ($\alpha_{sw}$) and the measured steering wheel angle rate ($\alpha'_{sw}$);
        calculating a future yaw rate ($\omega$) of the vehicle based on the measured velocity of the vehicle and the calculated future steering wheel angle ($\alpha_{sw}$);
        extrapolating a vehicle position of the vehicle in a set of future time frames, based on the calculated future yaw rate ($\omega$) and the vehicle velocity; and
        predicting the path of the vehicle based on the extrapolated vehicle positions in the set of future time frames;
    detecting the VRU and a position of the VRU;
    determining a velocity of the detected VRU;
    predicting a future position of the detected VRU, based on the VRU position upon detection and the determined VRU velocity;
    determining a geographical position of the vehicle;
    extracting statistical information related to a probability of a collision at the determined geographical position, wherein the probability of a collision is increased at geographical positions where a number of traffic accidents is exceeding a threshold limit; and
    performing an action for avoiding a collision when the predicted future position of the VRU is overlapping the predicted future path of the vehicle and based on the probability of a collision.

2. The method according to claim 1, wherein the predicted future path of the vehicle corresponds to a first area occupied by the vehicle during a set of future time frames, and wherein the predicted future position of the VRU comprises a second area wherein the VRU is expected to be situated at the set of future time frames, and wherein probability of a collision to occur is proportional to the overlap between the first area and the second area, and wherein the action is performed when the probability of a collision exceeds a first threshold limit.

3. The method according to claim 1, wherein the action to be performed comprises a silent warning visually or haptically displayed to the driver of the vehicle, an audible warning, a short brake jerk for alerting the driver, a full brake to standstill or an alert for warning the VRU of the collision risk.

4. The method according to claim 3, wherein the silent warning is visually or haptically displayed to the driver of the vehicle when the probability of a collision exceeds a first threshold limit; the audible warning is emitted when the probability of a collision exceeds a second threshold limit; the short brake jerk is performed when the probability of a collision exceeds a third threshold limit; the full brake to standstill is performed when the probability of a collision exceeds a fourth threshold limit.

5. The method according to claim 1, wherein the probability of a collision is increased when the VRU is detected and classified as an unattended animal or a person shorter than a configurable threshold length.

6. The method according to claim 1, further comprising: detecting a traffic structure related to increased probability of a collision, and wherein the action for avoiding a collision is performed based on the probability of a collision.

7. The method according to claim 1, wherein the detection of the VRU and the position of the VRU comprises:
   detecting an object by a camera of the vehicle;
   classifying the detected object as a VRU;
   detecting the object by a sensor of the vehicle;
   mapping the classified VRU with the object detected by the sensor; and
   tracking the VRU by the sensor.

8. The method according to claim 1 further comprising:
   extracting statistical information related to traffic accidents at the determined geographical position; and
   increasing the probability of a collision at geographical positions where a number of traffic accidents is exceeding the threshold limit.

9. A control unit in a vehicle, for avoiding a potential collision between the vehicle and a Vulnerable Road User VRU, wherein the control unit is configured for:
   predicting a future path of the vehicle by:
      measuring a velocity of the vehicle;
      measuring a steering wheel angle ($\alpha_{sw}$);
      measuring a steering wheel angle rate ($\alpha'_{sw}$);
      calculating a future steering wheel angle ($\alpha_{sw}$), based on the measured steering wheel angle ($\alpha_{sw}$) and the measured steering wheel angle rate ($\alpha'_{sw}$);
      calculating a future yaw rate ($\omega$) of the vehicle based on the measured velocity of the vehicle and the calculated future steering wheel angle ($\alpha_{sw}$);
      extrapolating a vehicle position of the vehicle in a set of future time frames, based on the calculated future yaw rate ($\omega$) and the vehicle velocity; and
      predicting the path of the vehicle based on the extrapolated vehicle positions in the set of future time frames;
   detecting the VRU and a position of the VRU via a sensor;
   determining a velocity of the detected VRU;
   predicting a future position of the detected VRU based on the position of the detected VRU and the determined VRU velocity;
   determining a geographical position of the vehicle;
   extracting statistical information related to a probability of a collision at the determined geographical position, wherein the probability of a collision is increased at geographical positions where a number of traffic accidents is exceeding a threshold limit; and
   performing an action for avoiding a collision when the predicted future position of the VRU is overlapping the predicted future path of the vehicle and based on the probability of a collision.

10. The control unit according to claim 9 further configured for:
   extracting statistical information related to traffic accidents at the determined geographical position; and
   increasing the probability of a collision at geographical positions where a number of traffic accidents is exceeding the threshold limit.

11. A computer program product comprising program code stored on a non-transitory computer-readable medium, said computer program product for avoiding a potential collision between a vehicle and a Vulnerable Road User VRU, said computer program product comprising computer instructions to cause one or more computer processors to perform the following operations:
   predicting a future path of the vehicle by:
      measuring a velocity of the vehicle;
      measuring a steering wheel angle ($\alpha_{sw}$);
      measuring a steering wheel angle rate ($\alpha'_{sw}$);
      calculating a future steering wheel angle ($\alpha_{sw}$), based on the measured steering wheel angle ($\alpha_{sw}$) and the measured steering wheel angle rate ($\alpha'_{sw}$);
      calculating a future yaw rate ($\omega$) of the vehicle based on the measured velocity of the vehicle and the calculated future steering wheel angle ($\alpha_{sw}$);
      extrapolating a vehicle position of the vehicle in a set of future time frames, based on the calculated future yaw rate ($\omega$) and the vehicle velocity; and
      predicting the path of the vehicle based on the extrapolated vehicle positions in the set of future time frames;
   detecting, using a sensor, the VRU and a position of the VRU;
   determining a velocity of the detected VRU;
   predicting a future position of the detected VRU, based on the VRU position upon detection and the determined VRU velocity;
   determining a geographical position of the vehicle;
   extracting statistical information related to a probability of a collision at the determined geographical position, wherein the probability of a collision is increased at geographical positions where a number of traffic accidents is exceeding a threshold limit; and
   performing an action for avoiding a collision when the predicted future position of the VRU is overlapping the predicted future path of the vehicle and based on the probability of a collision.

12. The computer program product according to claim 11 further configured for:
   extracting statistical information related to traffic accidents at the determined geographical position; and
   increasing the probability of a collision at geographical positions where a number of traffic accidents is exceeding the threshold limit.

13. A system for avoiding a potential collision between a vehicle and a Vulnerable Road User VRU, wherein the system comprises:
   a sensor on the vehicle, configured for detecting the VRU and the position of the VRU;
   a control unit configured for:
      predicting a future path of the vehicle by:
         measuring a velocity of the vehicle;
         measuring a steering wheel angle ($\alpha_{sw}$);
         measuring a steering wheel angle rate ($\alpha'_{sw}$);
         calculating a future steering wheel angle ($\alpha_{sw}$), based on the measured steering wheel angle ($\alpha_{sw}$) and the measured steering wheel angle rate ($\alpha'_{sw}$);
         calculating a future yaw rate ($\omega$) of the vehicle based on the measured velocity of the vehicle and the calculated future steering wheel angle ($\alpha_{sw}$);

extrapolating a vehicle position of the vehicle in a set of future time frames, based on the calculated future yaw rate ($\omega$) and the vehicle velocity; and predicting the path of the vehicle based on the extrapolated vehicle positions in the set of future time frames;

detecting the VRU and the position of the VRU via a sensor;

determining a velocity of the detected VRU;

predicting a future position of the detected VRU based on the position of the detected VRU and the determined VRU velocity;

determining a geographical position of the vehicle;

extracting statistical information related to a probability of a collision at the determined geographical position, wherein the probability of a collision is increased at geographical positions where a number of traffic accidents is exceeding a threshold limit; and performing an action for avoiding a collision when the predicted future position of the VRU is overlapping the predicted future path of the vehicle and based on the probability of a collision; and a warning emitting device on the vehicle, configured for emitting a warning for avoiding a collision.

14. The system according to claim 13, wherein in said control unit is further configured for:

extracting statistical information related to traffic accidents at the determined geographical position; and increasing the probability of a collision at geographical positions where a number of traffic accidents is exceeding the threshold limit.

\* \* \* \* \*